United States Patent [19]

Van Neste

[11] 4,047,922

[45] Sept. 13, 1977

[54] SLOW RELEASE COMPOSITION COMPRISING SLACK WAX-UREA ADDUCT

[75] Inventor: Walter Van Neste, St. Amandsberg, Belgium

[73] Assignee: S.A. Texaco Belgium N.V., Brussels, Belgium

[21] Appl. No.: 664,447

[22] Filed: Mar. 8, 1976

[51] Int. Cl.$^2$ .................................................. C05C 9/00
[52] U.S. Cl. ........................................ 71/28; 71/64 F; 71/64 G; 260/555 C
[58] Field of Search .................. 71/11, 28, 64 E, 64 F, 71/64 G; 260/555; 427/212; 252/384

[56] References Cited

U.S. PATENT DOCUMENTS

| | | | |
|---|---|---|---|
| 3,300,293 | 1/1967 | Bozzelli et al. | 71/28 |
| 3,300,294 | 1/1967 | Hollstein | 71/28 |
| 3,314,778 | 4/1967 | Campbell | 71/28 |

OTHER PUBLICATIONS

Encyc. of Chem. Tech., Kirk-Othmer, 2nd Ed., Interscience, pp. 93–102.

*Primary Examiner*—Frank A. Spear, Jr.
*Assistant Examiner*—Ferris H. Lander
*Attorney, Agent, or Firm*—Thomas H. Whaley; Carl G. Ries; Henry W. Archer

[57] ABSTRACT

Disclosed is a slow release fertilizer composition comprising a slack wax-urea adduct prepared by urea-dewaxing petroleum hydrocarbons in which the wax to urea ratio ranges from 0.08 to 0.30 and particularly intended for use on dry, desert-like soils. Solar radiation causes the wax to melt thereby slowly releasing the urea with the wax forming a biodegradable protective layer against wind erosion and water losses.

4 Claims, No Drawings

SLOW RELEASE COMPOSITION COMPRISING SLACK WAX-UREA ADDUCT

BACKGROUND OF THE INVENTION

1. Field of the Invention

This invention relates to slow release fertilizer compositions comprising slack-wax-urea adducts which are able to provide also a protective layer against wind erosion and excessive water loss from the soil to which they are applied. The slack wax-urea adducts are substantially untreated by-products of the urea dewaxing process which heretofore have had little or no commercial value.

The present invention is also concerned with a method for supplying fertilizers to dry soils while also preventing excessive water loss therefrom.

2. Statement of the Prior Art

The art to which this invention relates is aware, inter alia, of the following U.S. Pat. Nos. 3,192,032; 3,193,033; 3,205,061; 3,232,740; 3,289,733; and 3,300,293. The last mentioned patent discloses that the adduct formed by reacting urea and paraffin wax is a slow release fertilizer but that its water resistance is too low for most applications so that the same should be dispersed in paraffin or microcrystalline wax. According to the patent, the adduct can be formed in any of several methods but urea dewaxing is not mentioned. Moreover, the composition appears to be intended for use in areas of heavy rainfall and not, as here, of low rainfall.

SUMMARY OF THE INVENTION

In its composition aspect, the present invention resides in a composition comprising urea-slack wax adducts.

In its method aspect, the invention pertains to the preparation of such compositions and to the simultaneous provision of sowly released fertilizers and of a protective wax layer which prevents excessive water loss from the soil to which they are applied.

The slow release fertilizer according to the invention comprises a slack wax-urea adduct containing from 92.5 to 60 percent by weight of urea, the balance wax.

The slack wax-urea adducts of the invention are derived as by-products of the urea-dewaxing process which involves:

1. Formaton of urea paraffin adducts by contacting solid urea or aqueous urea solutions with diesel or gas oils at moderate temperatures in the presence of solvents which act as diluent and promotors.

2. Separation of the adducts from remaining oil/solvent mixture usually by mechanical means which can include filtration; centrifuging or gravity settling and decanting.

3. Decomposition of the adduct and separation of urea and wax by the application of heat and/or water or another solvent.

4. Recovery of solvents from the dewaxed oil and paraffin by distillation.

For lower oil content adducts, the adduct can be partially decomposed and reformed (repulping); again separated by filtrator washing and drying.

In a single stage process, 80-85% pure n-paraffin waxes are obtained. The impurities are mainly isoparaffins, lighter normal paraffins and minor amounts of aromatics and naphthenes. Solid urea dewaxing processes using hydrocarbonketone mixtures as a solvent or double stage (repulping) processes using dichloromethane as a solvent yield waxes of purities higher than 92%.

The adducts are obtained after the second process step described above. These adducts are white granular substances with a wax to urea ratio of about 1:5. The adducts contain some processing impurities such as diesel oil, gas oil and solvent (in situ dichloromethane). These compounds are removed by weathering the adduct crystals for 48 hours or until the amount of solvent retained does not exceed 0.1% by weight so as not to cause pollution of the subsoil. (A single stage process yields an adduct, when prepared from waxy crudes, e.g. Libyan-Arabian, with an aromatic content not exceeding 0.08% by weight). Aromatic pollution, though extremely small, can be reduced to almost zero when adducts involved originate from double stage (repulping) or solid urea dewaxing processes.

In essence, then, the wax-urea adducts of the invention are prepare by modifying the conventional urea dewaxing process so as not to produce pre wax and recycle urea by terminating the process after the urea-wax adduct separation. Conventionally, the solvents used in the process are low boiling point (below 80° C) halogenated aliphatic hydrocarbons; branched chain aliphatic ketones, pure aliphatic hydrocarbon (n-pentene, n-hexene, iso-heptenes) and mixtures thereof.

The amounts of the adducts to use per surface are a generally depends on the nature of the soil, the type of plants cultivated, degree of insolation and the like.

The following examples illustrate the successful application of the invention. In these examples, the performance of the urea adducts was compared with that of pure urea.

The adduct prepared as above was allowed to weather for 48 hours to lose its light, volatile components and any residual solvents. It contained 10 to 15% by weight of wax, balance urea.

This percentage composition is not considered critical, and variations from 5 – over 30 percent are tolerable.

EXAMPLE 1

Spinach Cultivation

Test Field (farming ground)

| | |
|---|---|
| 5 m | 5 m |
| (adduct) | (adduct) |
| 9.19 kg | 12.74 kg |
| A | B |
| (Urea) | (Urea) |
| 12.04 kg | 13.52 kg |
| C | D | a. Application of fertilizer

1st : 0.1 kg/m, 3 weeks after sowing
2nd : 0.1 kg/m, 5 1/2 weeks after sowing
Fields C and D pure urea
Fields A and B urea-adduct b. Crop yields As identified Field A (Adduct fertilizer) : 9.19 kg } 21.93 kg -continued

| | | |
|---|---|---|
| B (Adduct fertilizer) | : 12.74 kg | |
| Field C (pure urea) | : 12.04 kg | 25.56 kg |
| D (pure urea) | : 13.52 kg | |

No real difference in appearance was noted between the plants cultivated with adduct or pure urea, although the leaves of the adduct-treated plants were slightly larger. No harm to plants was noted and no evidence was found of hydrocarbon absorption. The slow release of urea from the adduct fertilizer was clearly shown by the concentration of urea in the top soil layer after the harvest.

For the spinach field, the concentration of urea in the top layer of the soil treated with adduct was about 1.47 times the concentration of the straight urea test field, and 1.27 times higher at a depth of 5 cm even though the adduct contains only 85% of urea and equal amounts by weight of adduct and pure urea were given to the experimental fields. For the lettuce field the figures were respectively 1.58 and 1.12 times higher. In both cases, the concentration of urea in the top layer soil is much higher for the adduct type fertilizer which indicates that this would be available for the next crop. Also simultaneous application of the fertilizer may not constitute the optimum technique for applying the adduct type fertilizer since this would release its urea later at a less appropriate moment. The paraffins biodegraded to a large extent, as shown by the fact that very little was found in the top soil.

c. Analysis of soil-samples

| | | % urea | % wax |
|---|---|---|---|
| Field A (adduct) | Surface | 0.25 | 0.04 |
| | 5 cm depth | 0.33} 0.58 | 0.02 |
| | 15 cm depth | 0.29 | trace |
| Field C (Urea) | Surface | 0.17 } 0.43 | none |
| | 5 cm depth | 0.26 | none |
| | 15 cm depth | 0.44 | none |

The above results were obtained on soil sampled after the harvest.

d. Analysis of crop

Equal amount of spinach were dried in a ventillated oven. The dry residue was weighed:

| | | |
|---|---|---|
| Field A | 6.8 % dry material | 12.4 |
| Field B | 5.6 % dry material | |
| Field C | 6.3 % dry material | 12.2 |
| Field D (urea) | 5.9 % dry material | |

EXAMPLE 2

Cultivation of lettuce

Test field:

| Urea adduct | Urea only |
|---|---|
| A | B |
| 33.81 kg | 35.50 kg | a. Application of fertilizer

| Urea adduct | Urea only |
|---|---| see spinach cultivation b. Crop yields

| | |
|---|---|
| Field A (adduct) | 33.81 kg/5 m² |
| Field B (urea) | 33.50 kg/5 m² |

No difference in appearance could be noted between the plants from test fields A and B.

c. Analysis of soil-samples

| | | % urea | % wax |
|---|---|---|---|
| Field A (adduct) | Surface | 0.30 | 0.04 |
| | 5 cm depth | 0.28 } 0.58 | 0.03 |
| | 15 cm depth | 0.28 | 0.02 |
| Field B (urea) | Surface | 0.19 | 0.01 |
| | 5 cm depth | 0.25} 0.44 | 0.02 |
| | 15 cm depth | 0.27 | 0.02 | d. Analysis of crop

Dried lettuce was extracted by petroleum ether to find if any material had been taken up by the plants.

| | % wt extract |
|---|---|
| Field A (adduct) | 1.40 |
| Field B (urea) | 1.34 |

This data shows comparable absorptions.

EXAMPLE 3

Cultivation of Tomatoes

Tomatoes were planted in two different types of soil. It should be noted that urea is not an ideal fertilizer for tomatoes but mainly for leaf-forming plants.

| Crop Collected over 3 weeks: | | |
|---|---|---|
| Farming soils (+ manure) | Sandy soil Urea (0.2 kg/m²) | Sandy soil Urea Adduct (0.2 kg/m²) |
| 4.75 kg/plant | 4.10 kg/plant | 4.00 kg/plant |

No significant differences are noted in crop yield from urea-adduct and pure urea test fields; however, a larger difference was found for the fast growing plants; viz. spinach. This may be due to the slow release of urea from the adduct fertilizer in the top layer during the early stage of cultivation.

In all cases, equal amounts by weight of fertilizer were given to the plants, meaning that the adduct-fertilizer treated plants received about 15% weight less urea.

In general, satisfactory results are achieved with the adducts of the invention by applying from 1,000 to 10,000 kg thereof per hectare either pure or combined with other conventional, commercial fertilizers containing phosphates, nitrates and the like.

It is to be understood that the foregoing specific examples are presented by way of illustration and explanation only and that the invention is not limited by the details of such examples.

The foregoing is believed to so disclose the present invention that those skilled in the art which it pertains can, by applying thereto current knowledge, readily modify it for various applications. Therefore, such modifications are intended to fall within the range of equivalence of the appended claims.

What is claimed is:

1. A slow release fertilizer composition adapted for use on dry, desert-type soils comprising a solvent-dewaxed slack was-urea adduct having a wax-to-urea ratio of about 1 to 5 containing from 92.5 to 60 percent by weight of urea, balance wax, said adduct containing no more than about 0.1 weight percent of solvent, said wax having a melting point such as to melt under solar radiation to slowly release said urea and form a biodegradable protective layer against wind erosion and water loss from said soils.

2. A method of simultaneously providing urea fertilizer to dry, desert type soils and of forming a protective layer thereon for preventing wind erosion and water losses which comprises applying from 1,000 to 10,000 kg. per hectares of a slack wax urea adduct containing from 92.5 to 60 percent by weight of urea, balance wax.

3. The method of claim 2 wherein said adduct is applied in combination with conventional fertilizers.

4. A method of making a slack-wax urea adduct which comprises contacting urea and a diesel or gas oil with a solvent of the group of low boiling point halogenated aliphatic hydrocarbons; branched chain aliphatic ketones, pure aliphatic hydrocarbons (n-pentane, n-hexane, iso-heptanes) and mixtures thereof to thereby form a wax-urea ratio of about 1 to 5; separating the adduct thus forming and removing substantially all of the solvent therefrom by weathering said adduct until the amount of solvent retained does not exceed 0.1% by weight thereof.

* * * * *